United States Patent
Yoo et al.

(10) Patent No.: US 7,924,682 B2
(45) Date of Patent: Apr. 12, 2011

(54) UNIT TO REMOVE CROSSTALK IN MULTI-LAYERED DISK, OPTICAL PICKUP INCLUDING THE UNIT, AND OPTICAL RECORDING AND/OR REPRODUCING APPARATUS INCLUDING THE OPTICAL PICKUP

(75) Inventors: Jang-hoon Yoo, Seoul (KR); Yong-han Yoon, Suwon-si (KR); Soo-hen Park, Yongin-si (KR); Young-sun Jeong, Seoul (KR); Myoung-seek Kim, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 522 days.

(21) Appl. No.: 11/970,638

(22) Filed: Jan. 8, 2008

(65) Prior Publication Data

US 2008/0165641 A1    Jul. 10, 2008

(30) Foreign Application Priority Data

Jan. 8, 2007 (KR) .................. 10-2007-0002179
May 22, 2007 (KR) .................. 10-2007-0049958

(51) Int. Cl.
*G11B 7/00* (2006.01)
(52) U.S. Cl. ................. 369/112.07; 369/47.17
(58) Field of Classification Search .......... None
See application file for complete search history.

(56) References Cited

U.S. PATENT DOCUMENTS

| | | | |
|---|---|---|---|
| 4,832,446 A | 5/1989 | Miyagawa | |
| 5,072,437 A | 12/1991 | Chikuma | |
| 5,966,364 A | 10/1999 | Kamatani | |
| 6,992,965 B1 | 1/2006 | Glushko et al. | |
| 2002/0101798 A1* | 8/2002 | Kim et al. | 369/44.23 |
| 2003/0053393 A1* | 3/2003 | Shimano et al. | 369/112.02 |
| 2004/0022164 A1 | 2/2004 | Nishioka et al. | |
| 2005/0161579 A1* | 7/2005 | Kim et al. | 250/201.5 |
| 2006/0193236 A1 | 8/2006 | Watabe et al. | |
| 2006/0221785 A1 | 10/2006 | Yamamoto | |

FOREIGN PATENT DOCUMENTS

| | | |
|---|---|---|
| EP | 1 494 226 A3 | 12/2007 |
| JP | 63-239419 | 5/1988 |
| JP | 8-147750 | 6/1996 |

(Continued)

OTHER PUBLICATIONS

Office Action issued in corresponding European Patent Application No. 07123641.8 dated Apr. 28, 2008.

(Continued)

*Primary Examiner* — Christopher R Lamb
(74) *Attorney, Agent, or Firm* — Stanzione & Kim, LLP (57) ABSTRACT

A unit to remove crosstalk in a multi-layered disk, an optical pickup including the unit, and an optical recording and/or reproducing apparatus including the optical pickup, of which the optical pickup includes: a light source; an optical path changer to change the path of light emitted from the light source; a unit to remove crosstalk; an objective lens to focus incident light on a disk; and a photodetector detecting light reflected by the disk such that the unit to remove crosstalk separates light reflected by a target recording layer of the disk from light reflected by adjacent recording layers so that the light reflected by the target recording layer and the light reflected by the adjacent recording layers do not overlap on the photodetector.

10 Claims, 10 Drawing Sheets

FOREIGN PATENT DOCUMENTS

| | | |
|---|---|---|
| JP | 10-69659 | 3/1998 |
| JP | 2005-63595 | 3/2005 |
| JP | 2006-48807 | 2/2006 |
| KR | 2001-48963 | 6/2001 |
| KR | 2007-44275 | 4/2007 |

OTHER PUBLICATIONS

European Search Report issued in European Patent Application No. 07123641.8 on Jun. 27, 2008.

* cited by examiner

UNIT TO REMOVE CROSSTALK IN MULTI-LAYERED DISK, OPTICAL PICKUP INCLUDING THE UNIT, AND OPTICAL RECORDING AND/OR REPRODUCING APPARATUS INCLUDING THE OPTICAL PICKUP

CROSS-REFERENCE TO RELATED PATENT APPLICATIONS

This application claims the benefit of Korean Patent Applications Nos. 2007-2179, filed Jan. 8, 2007 and 2007-49958 filed May 22, 2007, in the Korean Intellectual Property Office, the disclosure of which is incorporated herein in their entireties by reference.

BACKGROUND OF THE INVENTION

1. Field of the Invention

Aspects of the present invention relate to a unit to remove crosstalk in a multi-layered disk, an optical pickup including the unit, and an optical recording and/or reproducing apparatus including the optical pickup.

2. Description of the Related Art

Optical disks, such as compact disks (CDs) and digital versatile disks (DVDs), are information storage media on and/or from which information is recorded and/or reproduced. Optical pickups record and/or reproduce information on and/or from an optical disk and include an objective lens that focuses a laser beam on the optical disk.

Much research has recently been conducted to develop next-generation high-density optical disks, such as high-definition digital versatile disks (HD-DVDs), Blu-ray disks (BDs), and advanced optical disks (AODs).

Such optical disks use laser light having different wavelengths and an objective lens having different numerical apertures (NA), depending on capacity of the optical disk. In optical recording and/or reproducing apparatuses that use a light spot on which a laser light is focused by an objective lens, in order to record and/or reproduce information on and/or from an information storage medium, the recording capacity is determined by the size S of the light spot. The size S of the light spot is determined by the wavelength λ of the laser light and the NA of the objective lens as shown in $$S \propto \frac{\lambda}{NA}. \tag{1}$$

Accordingly, in order to increase the recording density of the optical disk, the wavelength of the laser light must be reduced and the NA of the objective lens must be increased.

However, components used to reduce the wavelength of the laser light are expensive. Also, an increase in the NA decreases the depth of focus in proportion to the square of the NA and increases coma aberration in proportion to the cube of the NA. Accordingly, there are limitations in increasing the recording density using the laser light and the objective lens.

Accordingly, in order to increase the recording density, a method of making a recording layer thicker has been proposed. However, in the case of a multi-layered disk, as a space between adjacent layers decreases, not only light reflected by a target recording layer but also light reflected by a recording layer adjacent to the target recording layer are detected by a photodetector and the light reflected by the adjacent recording layer (i.e., noise) affects a desired signal.

Figure 1:
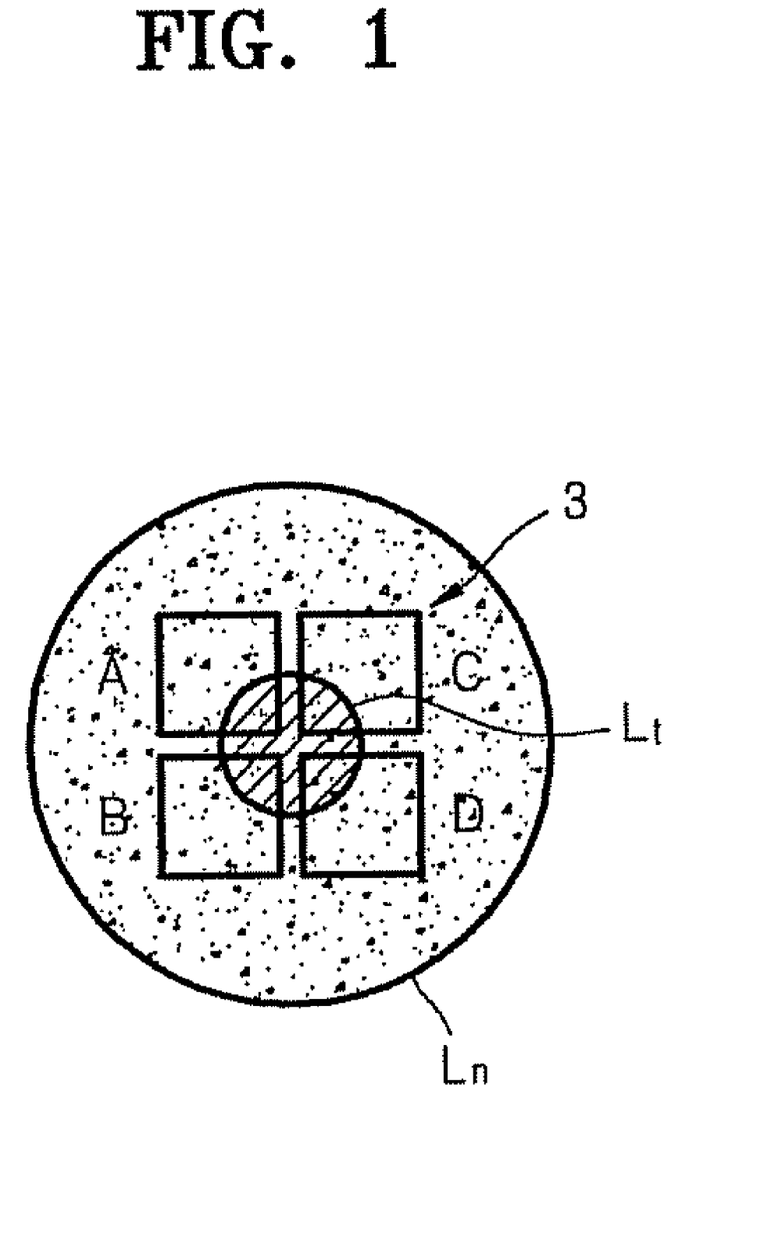
FIG. 1 illustrates light spots formed on a photodetector of a conventional optical pickup.

FIG. 1 illustrates light spots $L_t$ and $L_n$ formed on a 4-divided photodetector 3 of a conventional optical pickup. Referring to FIG. 1, light reflected by a target recording layer is focused into a light spot $L_t$ on the photodetector 3. The light spot $L_t$ is converted into an electrical signal which is output as a reproduction signal. For example, the reproduction signal may be detected as the sum signal of four light reception areas (A+B+C+D) of the photodetector 3. When the light reflected by the target recording layer from which information is to be reproduced is focused onto the light spot $L_t$ on the photodetector 3, light reflected by a recording layer adjacent to the target recording layer reaches the photodetector 3 and forms a light spot $L_n$ larger than the light spot $L_t$. Since the light spot $L_n$ of the light reflected by the recording layer adjacent to the target recording layer is diffused and then formed all over the photodetector 3, the light spot $L_n$ is combined with the light spot $L_t$ from the target recording layer, thereby causing noise in the reproduction signal.

SUMMARY OF THE INVENTION

Aspects of the present invention provide a unit to remove crosstalk, which can prevent light reflected by a recording layer adjacent to a target recording layer of a disk having a plurality of recording layers from interfering with a reproduction signal.

Aspects of the present invention also provide an optical pickup that can stably detect a reproduction signal by suppressing interference from a nearby recording layer of a target recording layer, and an optical recording and/or reproducing apparatus including the optical pickup.

According to an aspect of the present invention, there is provided a unit to remove crosstalk, the unit comprising: a reflecting region to reflect incident light thereon; and a transmitting region arranged about the reflecting region and to transmit the incident light, wherein the unit is tilted at a predetermined angle with respect to the optical axis of the incident light so that light reflected by the reflecting region is reflected in a direction other than a direction in which the incident light is incident.

According to another aspect of the present invention, there is provided a unit to remove crosstalk by diffracting and preventing light reflected by a recording layer adjacent to a target recording layer, on and/or from which data is to be recorded and/or reproduced, of a disk having a plurality of recording layers from interfering with light reflected by the target recording layer, the unit comprising: a first refracting surface diffusing incident light thereon; and a second refracting surface arranged about the first refracting surface, the second refracting surface having a curvature smaller than that of the first refracting surface, and to focus the incident light on the target recording layer. The first refracting surface may be concave or convex.

According to another aspect of the present invention, there is provided a unit to remove crosstalk, the unit comprising: a diffracting region to diffract light reflected by a recording layer adjacent to a target recording layer, on and/or from which data is to be recorded and/or reproduced, of a disk having a plurality of recording layers to prevent the light reflected by the adjacent recording layer from interfering with light reflected by the target recording layer; and a transmitting region arranged about the diffracting region and to transmit incident light, wherein the diffracting region is divided into a first region and a second region, and the first and second regions have diffraction patterns arranged in different directions. The diffraction pattern of the first region and the diffraction pattern of the second region may be arranged to intersect each other at a right angle.

According to another aspect of the present invention, there is provided an optical pickup recording and/or reproducing data on and/or from a target recording layer of a disk having a plurality of recording layers, the optical pickup comprising: a light source; an optical path changer changing the path of light emitted from the light source; a unit to remove crosstalk, the unit comprising a reflecting region to reflect light incident from the optical path changer and a transmitting region to transmit the incident light, wherein the unit to remove the crosstalk is tilted at a predetermined angle with respect to the optical axis of the incident light so that light reflected by the reflecting region is reflected in a direction other than a direction in which the incident light is incident; an objective lens to focus incident light on the disk; and a photodetector detecting light reflected by the disk.

According to another aspect of the present invention, there is provided an optical pickup recording and/or reproducing data on and/or from a target recording layer of a disk having a plurality of recording layers, the optical pickup comprising: a light source; a beam splitter to reflect a part of incident light and to transmit the rest of the incident light; a unit to remove crosstalk, the unit comprising a first refracting unit to focus light incident thereon from the beam splitter and a second refracting unit having a curvature greater than that of the first refracting surface to diffuse the incident light; an objective lens to focus incident light on the disk; and a photodetector to detect light reflected by the disk.

According to another aspect of the present invention, there is provided an optical pickup recording and/or reproducing data on and/or from a target recording layer of a disk having a plurality of recording layers, the optical pickup comprising: a light source; a beam splitter to reflect a part of incident light thereon and to transmit the rest of the incident light; a unit to remove crosstalk, the unit comprising a diffracting region to diffract light reflected by a recording layer adjacent to the target recording layer to prevent the light reflected by the adjacent recording layer from interfering with light reflected by the target recording layer and a transmitting region arranged about the diffracting region and to transmit light incident from the beam splitter; an objective lens to focus incident light on the disk; and a photodetector to detect light reflected by the disk, wherein the diffracting region is divided into first and second regions and the first and second regions have diffraction patterns arranged in different directions.

According to another aspect of the present invention, there is provided an optical recording and/or reproducing apparatus comprising: an optical pickup to record and/or reproduce data on and/or from a target recording layer of a disk having a plurality of recording layers; a driving unit to drive the optical pickup; and a control unit to control the optical pickup, wherein the optical pickup comprises: a light source; an optical path changer to change the path of light emitted from the light source; a unit to remove crosstalk, the unit comprising a reflecting region to reflect light incident thereon from the optical path changer and a transmitting region to transmit the incident light wherein the unit to remove the crosstalk is tilted at a predetermined angle with respect to the optical axis of the incident light to enable light reflected by the reflecting region to travel in a direction other than a direction in which the incident light is incident; an objective lens focusing incident light on the disk; and a photodetector detecting light reflected by the disk.

According to another aspect of the present invention, there is provided an optical recording and/or reproducing apparatus comprising: an optical pickup to record and/or reproduce data on and/or from a target recording layer of a disk having a plurality of recording layers; a driving unit to drive the optical pickup; and a control unit to control the optical pickup, wherein the optical pickup comprises: a light source; a beam splitter to reflect a part of incident light thereon and to transmit the rest of the incident light; a unit to remove crosstalk, the unit comprising a first refracting unit to focus light incident thereon from the beam splitter and a second refracting unit having a curvature greater than that of the first refracting surface and to diffuse the incident light; an objective lens to focus incident light on the disk; and a photodetector to detect light reflected by the disk.

According to another aspect of the present invention, there is provided an optical recording and/or reproducing apparatus comprising: an optical pickup to record and/or reproduce data on and/or from a target recording layer of a disk having a plurality of recording layers; a driving unit to drive the optical pickup; and a control unit to control the optical pickup, wherein the optical pickup comprises: a light source; a beam splitter to reflect a part of incident light thereon and to transmit the rest of the incident light; a unit to remove crosstalk, the unit comprising a diffracting region to diffract and prevent light reflected by a recording layer adjacent to the target recording layer from interfering light reflected by the target recording layer, and a transmitting region arranged about the diffracting region and transmitting light incident from the beam splitter; an objective lens to focus incident light on the disk; and a photodetector to detect light reflected by the disk, wherein the diffracting region is divided into first and second regions and the first and second regions have diffraction patterns arranged in different directions.

According to another aspect of the present invention, there is provided a unit to remove crosstalk, the unit comprising: a diffracting region to selectively reduce crosstalk between light reflected by adjacent recording layers and to selectively transmit light reflected by a target recording layer among the adjacent recording layers; and a transmitting region arranged about the diffracting region to transmit light having different wavelengths wherein a diffraction efficiency of the diffracting region is determined according to the light having different wavelengths. The unit may be integrally formed with an objective lens.

The transmitting region may include a first region arranged about an optical axis and a second region arranged about the first region, wherein the first region is commonly used for light having wavelengths of 400±20 nm, 660±20 nm, and 780±20 nm, and the second region is commonly used for light having wavelengths of 400±20 nm and 660±20 nm.

The transmitting region may include a first region arranged about an optical axis, a second region arranged about the first region, and a third region arranged about the second region and is usable for first through third wavelengths in order of decreasing size, wherein the first region is commonly used for the light having the first through third wavelengths, the second region is commonly used for the light having the second and third wavelengths, and the third region is commonly used for the light having the second wavelength.

The diffracting region may block the light having the third wavelength having a lower diffraction efficiency of zero order diffracted light for the third wavelength, and transmit the light having the first and second wavelengths by having a higher diffraction efficiency of the zero order diffracted light for the first and second wavelengths.

The diffracting region may include a pattern having a depth of 200 to 400 nm.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the aspects present invention by referring to the figures.

In order to prevent light reflected by a recording layer adjacent to a target recording layer, on and/or from which data is to be recorded and/or reproduced, of a disk having a plurality of recording layers from interfering with light reflected by the target recording layer and generating noise, a unit to remove crosstalk according to aspects of the present invention blocks light incident on a central portion thereof and prevents such light from reaching the disk or blocks light reflected by the disk and incident on the central portion of the unit to remove the crosstalk and prevents such light from reaching a photodetector.

Figure 2:
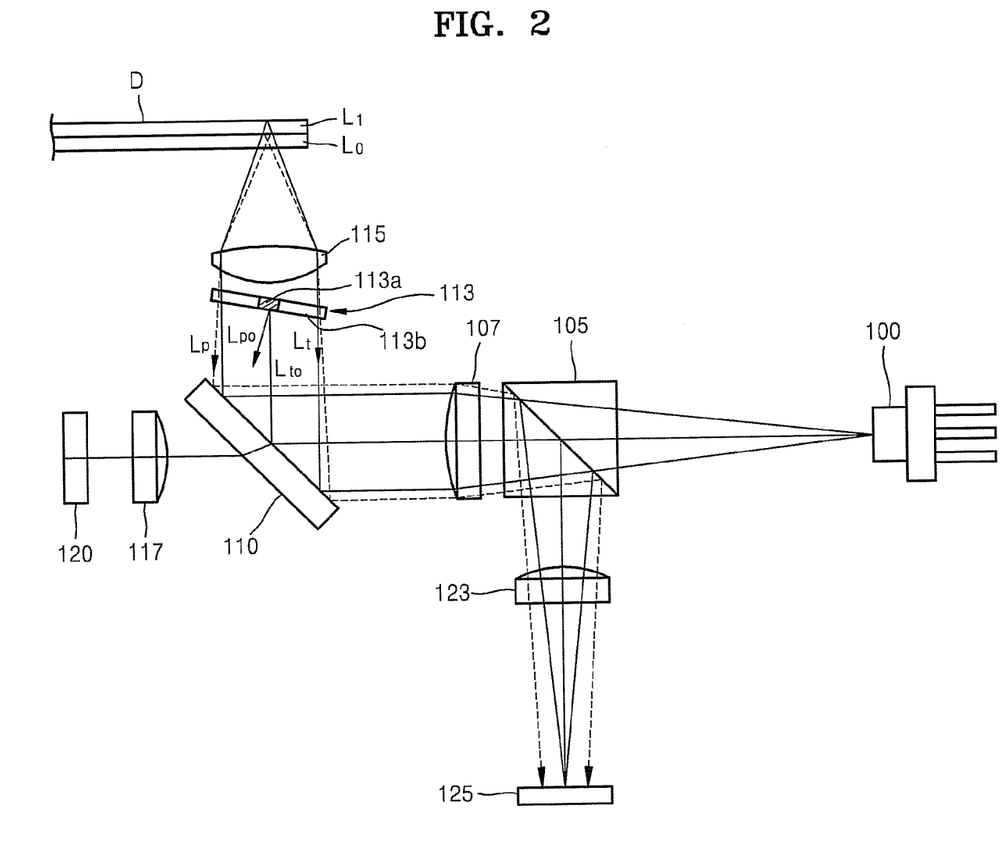
FIG. 2 illustrates an optical pickup including a unit to remove crosstalk according to an exemplary embodiment of the present invention.

FIG. 2 illustrates an optical pickup 200 including a unit 113 to remove crosstalk according to an exemplary embodiment of the present invention. The optical pickup 200 includes a light source 100, a beam splitter 105 reflecting a part of light incident thereon from the light source 100 and transmitting the rest of the incident light, an objective lens 115 focusing light incident from the beam splitter on a disk D, and the unit 113 to remove crosstalk disposed between the beam splitter 105 and the objective lens 115. Also, the optical pickup 200 includes a photodetector 125 for detecting light reflected from a disk D.

The unit 113 to remove crosstalk includes a central reflecting region 113a reflecting light incident thereon from among the light incident from the beam splitter 105 and a transmitting region 113b arranged about the reflecting region 113a and transmitting light incident thereon from among the light incident from the beam splitter 105. The transmitting region 113b is arranged about the reflecting region 113a such that the transmitting region 113b may be arranged about a periphery of the reflecting region 113a or may entirely surround the reflecting region 113a according to different aspects. The reflecting region 113a may be formed by applying a reflective coating to a transparent glass. The unit 113 to remove crosstalk is tilted at a predetermined angle with respect to the optical axis of the incident light thereon to reflect the light, which is reflected by the reflecting region 113a, along the same path as that of the light incident on the unit 113 to remove crosstalk and prevent the light from entering the photodetector 125. The tilting of the unit 113 to remove crosstalk with respect to the optical axis does not affect the light transmitted through the transmitting region 113b.

Light emitted from the light source 100 is transmitted through the beam splitter 105 to the unit 113 to remove crosstalk. From among the light emitted from the light source 100, light incident on the reflecting region 113a is reflected by the reflecting region 113a, thereby failing to reach the disk D, and light passing through the transmitting region 113b is focused on the disk D by the objective lens 115. When a target recording layer on and/or from which data is to be recorded and/or reproduced is a second recording layer $L_1$, from among the light passing through the transmitting region 113b, light incident on the second recording layer $L_1$ of the disk D is focused on the second recording layer $L_1$ of the disk D by the objective lens 115, whereas diffused light incident on a first recording layer $L_0$ adjacent to the target recording layer $L_1$ reaches the first recording layer $L_0$. When a distance between the first and second recording layers $L_0$ and $L_1$ is large, the degree of diffusion of the diffused light formed on the first recording layer $L_0$ adjacent to the target recording layer L1 is sufficiently high so as to not act as a signal. However, when the distance is small, the diffused light may act as a signal.

Figure 3:
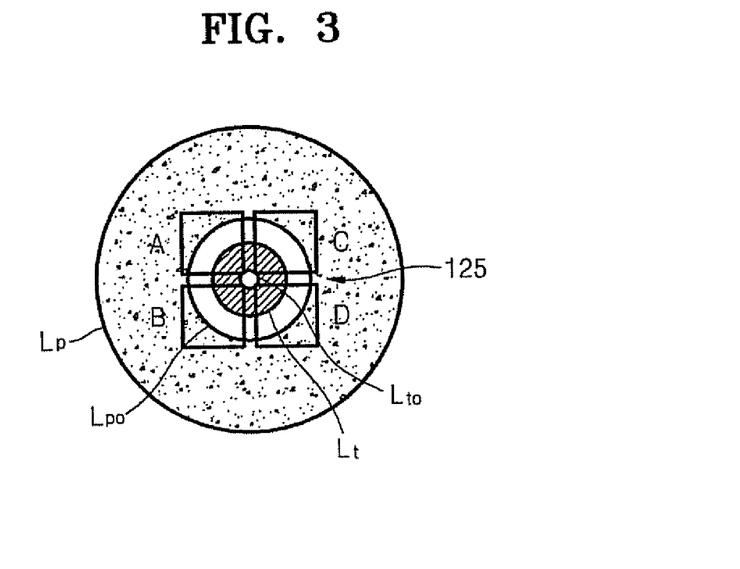
FIG. 3 illustrates light spots formed on a photodetector of the optical pickup of FIG. 2.

Light reflected by the disk D passes through the objective lens 115 and the transmitting region 113b of the unit to remove the crosstalk, and is reflected by the beam splitter 105 to the photodetector 125. However, the light incident on the reflecting region is blocked from reaching the disk D, and thus is not detected by the photodetector 125. FIG. 3 illustrates light spots reflected by the disk D and formed on the photodetector 125. Here, $L_t$ denotes a light spot of light reflected by the target recording layer $L_1$, $L_{to}$ denotes a light spot of light reflected by the target recording layer $L_1$ and then blocked by the reflecting region 113a, $L_p$ denotes a light spot of light reflected by the recording layer $L_0$ adjacent to the target recording layer $L_1$, and $L_{po}$ denotes a light spot reflected by the recording layer $L_0$ adjacent to the target recording layer $L_1$ and then blocked by the reflecting region 113a.

The light spot $L_{po}$ of the light reflected by the recording layer $L_0$ adjacent to the target recording layer $L_1$ and then blocked by the reflecting region 113a is larger than the light spot $L_t$ of the light reflected by the target recording layer $L_1$. Accordingly, the light spot $L_p$ of the light reflected by the recording layer $L_0$ adjacent to the target recording layer $L_1$ is prevented from interfering with the light spot $L_t$ of the light reflected by the target recording layer $L_1$. Although light loss occurs because of the light reflected by the target recording layer $L_1$ and then blocked by the reflecting region 113a, the light loss is low and rarely affects a reproduction signal.

The unit 113 to remove crosstalk 113 and the objective lens 115 may be integrally formed with each other. That is, crosstalk can be removed by forming a reflecting region at a central portion of the objective lens 115 instead of the unit 113 to remove crosstalk.

Referring back to FIG. 2, a collimating lens 107 to collimate light may be disposed in an optical path between the beam splitter 105 and the unit 113 to remove crosstalk. An optical patch changer 110 may be disposed between the collimating lens 107 and the unit 113 to remove crosstalk. The optical path changer 110 may include a beam splitter that reflects most of light and transmits the rest of the light. Light emitted from the light source 100 is transmitted through the beam splitter 105 and the optical path changer 110 to a monitoring photodetector 120. The monitoring photodetector 120 detects the intensity of the light emitted from the light source 100.

Condensing lenses 123 and 117 may be respectively disposed between the beam splitter 105 and the photodetector 125 and between the optical path changer 110 and the monitoring photodetector 120.

Although the unit 113 to remove crosstalk includes the reflecting region 113a in FIG. 2, it is understood that crosstalk can be removed in other various ways.

Figure 4A:
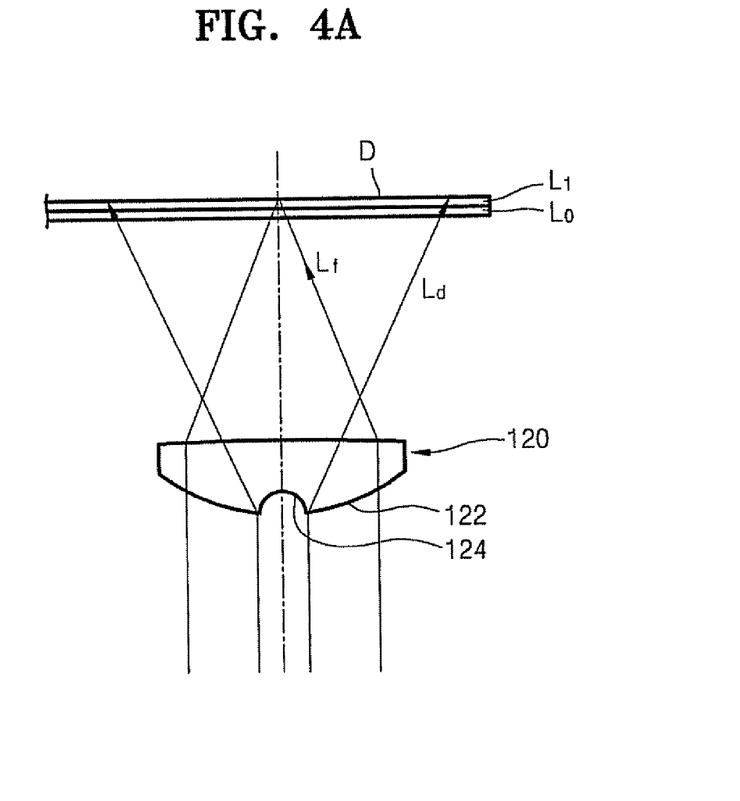
FIGS. 4A and 4B illustrate a unit to remove crosstalk according to another exemplary embodiment of the present invention.

FIG. 4A illustrates a unit 120 to remove crosstalk according to another exemplary embodiment of the present invention. Referring to FIG. 4A, the unit 120 to remove crosstalk includes a first refracting surface 124 to diffuse incident light thereon, and a second refracting surface 122 to focus the incident light thereon. The first refracting surface 124 is formed at a central portion of the unit 120 to remove crosstalk, and the second refracting surface 122 surrounds the first refracting surface 124 and has a curvature smaller than that of the first refracting surface 124.

The first refracting surface 124 having a greater curvature than the second refracting surface 122 diffuses incident light thereon, and the second refracting surface 122 having a smaller curvature than the first refracting surface 124 focuses the incident light thereon. Referring to FIG. 4A, the first refracting surface 124 is concave. Light $L_d$ diffused by the first refracting surface 124 is reflected at a large angle by a disk D to the outside of the unit 120 to remove crosstalk, thereby not reaching a photodetector. Light focused on the disk D by the second refracting surface 122 is reflected by the disk D to the photodetector and is output as a reproduction signal.

Figure 4B:
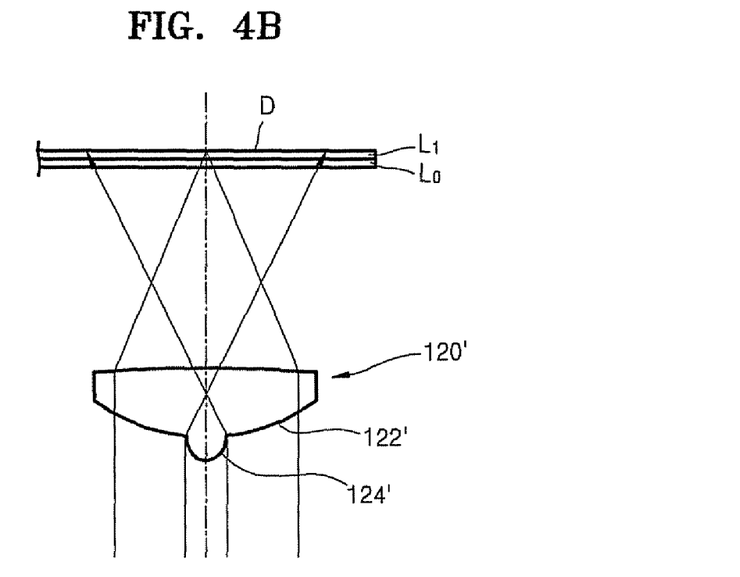

FIG. 4B illustrates a unit 120' for removing crosstalk according to another exemplary embodiment of the present invention. Referring to FIG. 4B, a unit 120' to remove crosstalk includes a first refracting surface 124' and a second refracting surface 122'. The first refracting surface 124' is convex. Light $L_d'$ incident on the first refracting surface 124' is focused at a position close to the first refracting surface 124' and then diffused to the disk D. The light $L_d'$ diffused to the disk D is reflected by the disk D to the outside of the unit 120' to remove crosstalk, thereby not interfering with a reproduction signal. The units 120 or 120' to remove crosstalk may be separately formed from an objective lens, and the first refracting surfaces 124 or 124' may be formed at a central portion of the objective lens.

Figure 5A:
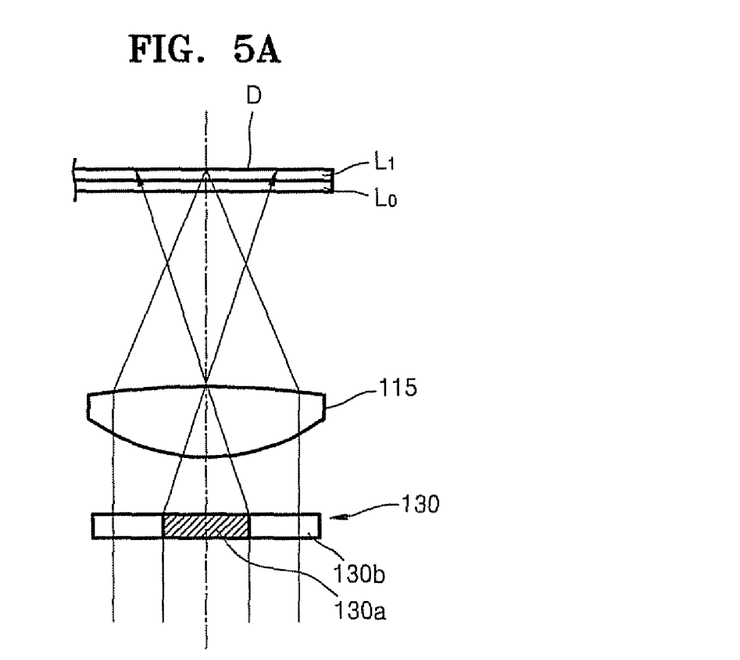
FIG. 5A illustrates a unit to remove crosstalk according to another exemplary embodiment of the present invention.

FIG. 5A illustrates a unit 130 to remove crosstalk according to another exemplary embodiment of the present invention. Referring to FIG. 5A, the unit 130 to remove crosstalk includes a central diffracting region 130a and a transmitting region 130b arranged about the diffracting region 130a. The transmitting region 130b is arranged about the diffracting region 130a such that the transmitting region 130b may be arranged about a periphery of the diffracting region 130a or may entirely surround the diffracting region 130a according to different aspects. The diffracting region 130a diffracts incident light and prevents light reflected by a disk D from reaching a photodetector. An objective lens 115 is disposed between the disk D and the unit 130 to remove crosstalk. However, the unit 130 to remove crosstalk may be integrally formed with the objective lens 115. That is, a diffracting region may be formed at a central portion of the objective lens 115.

Figure 5B:
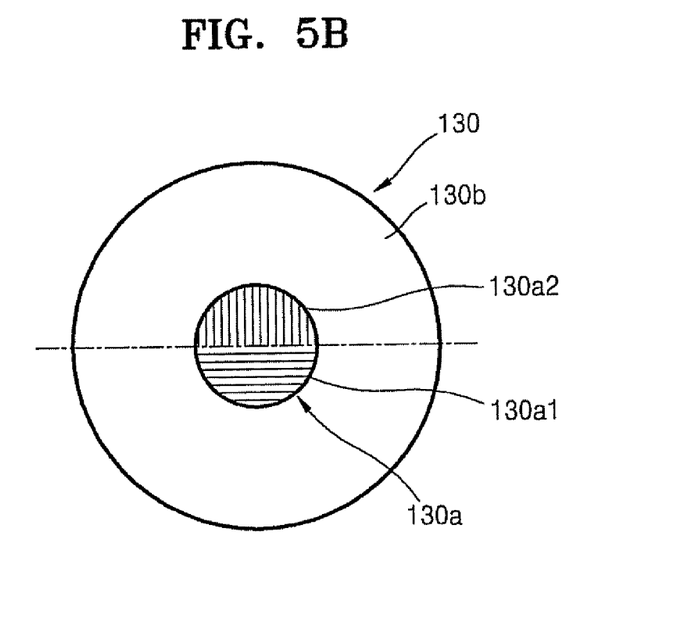
FIG. 5B illustrates diffraction patterns of the unit to remove the crosstalk of FIG. 5A.

FIG. 5B is a plan view of the unit 130 to remove crosstalk of FIG. 5A. The diffracting region 130a is divided into first and second regions 130a1 and 130a2, and the diffraction pattern of the first region 130a1 and the diffraction pattern of the second region 130a2 may be arranged in different directions. For example, the diffraction pattern of the first region 130a1 and the diffraction pattern of the second region 130a2 may be arranged to intersect each other at a right angle. However, it is understood that the diffraction pattern of the first region 130a1 and the diffraction pattern of the second region 130a2 may be arranged to intersect each other at any angle.

Figure 6A:
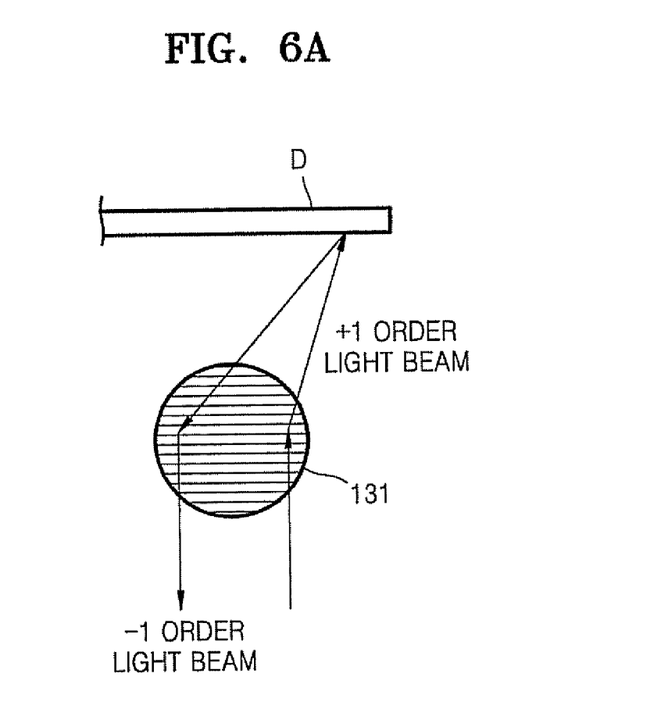
FIGS. 6A and 6B illustrate the paths of light when a single diffraction pattern is formed.

FIGS. 6A and 6B illustrate the movement of diffracted light when a single diffraction pattern is formed. Referring to FIG. 6A, light is diffracted by a diffracting region 131 and is reflected by a disk D. FIG. 6A illustrates only a +1 order light beam from among the light diffracted by the diffracting region 131. The +1 order light beam is reflected by the disk D to the diffracting region 131. The +1 order light beam is diffracted by the diffracting region 131 again in a direction parallel to a direction in which a −1 order light beam is first incident on the diffracting region 131 because the diffracting region 131 has only the single diffraction pattern. Accordingly, the light passing through the diffracting region 131 is incident on a photodetector and may cause crosstalk.

Figure 6B:
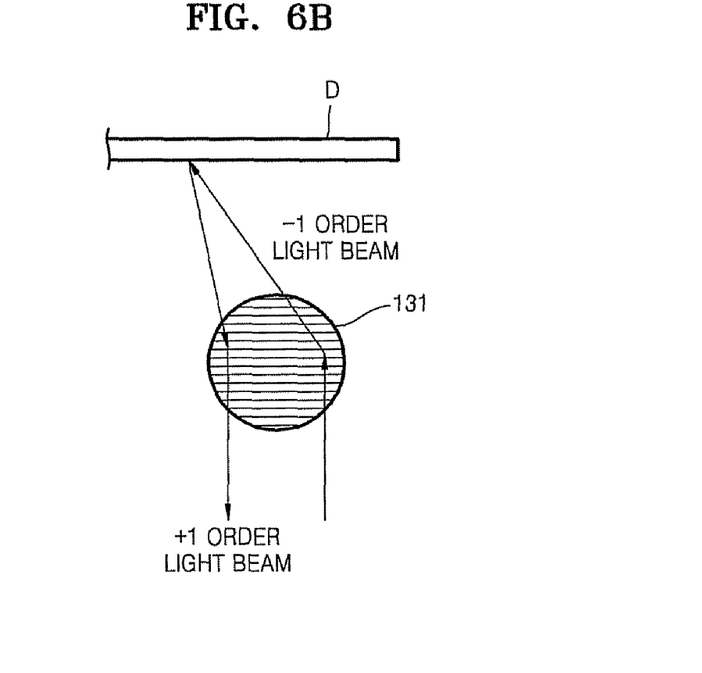

FIG. 6B illustrates only the −1 order light beam from among the light diffracted by the diffracting region 131. Referring to FIG. 6B, the −1 order light beam is reflected by the disk D and diffracted by the diffracting region 131 in a direction parallel to a direction in which the +1 order light beam is first incident on the diffracting region 131. The light passing through the diffracting region 131 is incident on the photodetector and may cause crosstalk.

Figure 7:
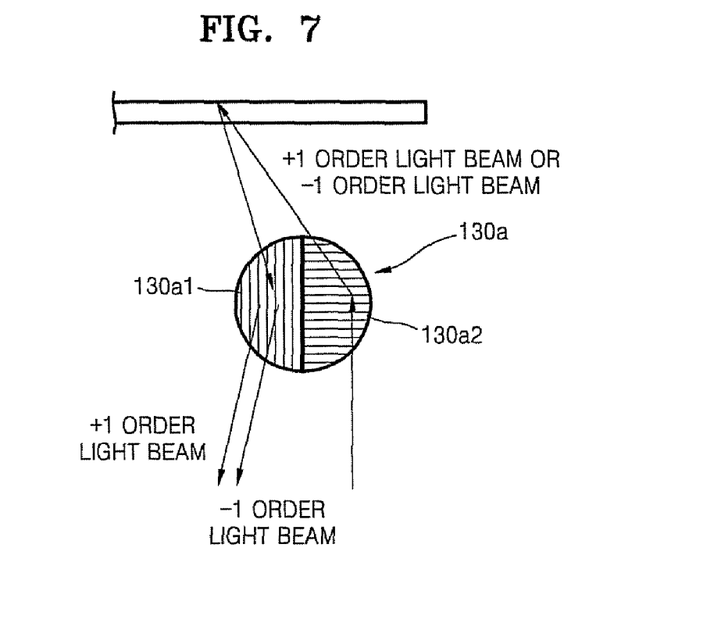
FIG. 7 illustrates the operation of the unit to remove the crosstalk of FIG. 5A.

In order to prevent light reflected by a disk D from entering a photodetector through a diffracting region, the diffracting region may be divided into two regions and the diffraction patterns of the two regions may be arranged in different directions. FIG. 7 illustrates the operation of the unit 130 to remove crosstalk of FIG. 5A when the diffraction patterns of the first region 130a1 and the second regions 130a2 are arranged to intersect each other at right angles. However, again, it is understood that the diffraction patterns of the first region 130a1 and the second regions 130a2 are arranged to intersect each other at any angle. Referring to FIG. 7, incident light is diffracted into a +1 order light beam and a −1 order light beam and is incident on the disk D. Light reflected by the disk D is diffracted by the second region 130a2 in a direction different from a direction in which the light is incident upon the first region 130a1 because the diffraction patterns of the second region 130a2 and the first region 130a1 are arranged in different directions. Accordingly, the light passing through the diffracting region 130a is not incident on the photodetector, thereby preventing crosstalk. Although the diffracting region 130a is divided into the two regions 130a1 and 130a2 in FIG. 7, the diffracting region 130a may be divided into three or more regions and the diffraction patterns of the regions may be arranged in different directions.

Figure 8:
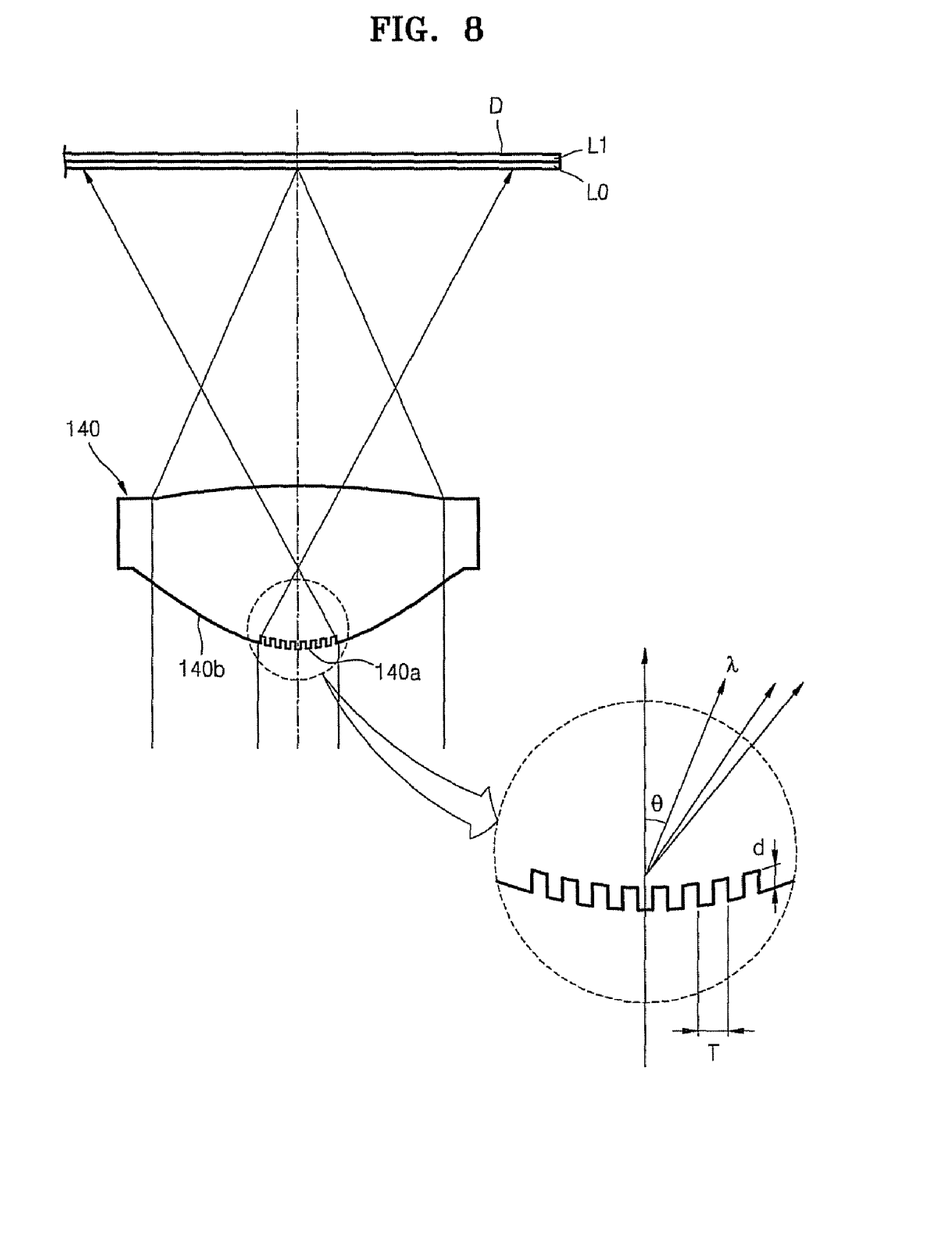
FIG. 8 illustrates a unit to remove crosstalk, which is integrally formed with an objective lens, according to another exemplary embodiment of the present invention.
Figure 9A:
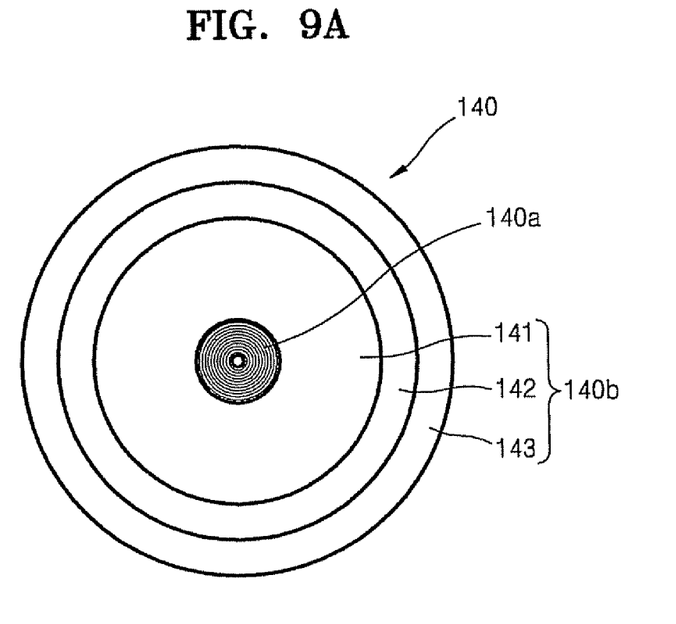
FIGS. 9A and 9B illustrate regions divided from a transmitting region of the unit to remove crosstalk of FIG. 8 according to wavelengths.

FIG. 8 illustrates a unit to remove crosstalk, which is integrally formed with an objective lens 140, according to another exemplary embodiment of the present invention. Referring to FIG. 8, the objective lens 140 includes a diffracting region 140a and a transmitting region 140b. The objective lens 140 is designed to be used for light having a plurality of wavelengths such that the diffracting region 140a blocks light having a specific wavelength and transmits light having a wavelength other than the specific wavelength. Diffraction efficiency may be defined as the ratio of the intensity of diffracted light to the intensity of incident light, and may be controlled by changing the depth d of a diffraction pattern. Reference symbol T denotes the pitch of the diffraction pattern. The diffraction efficiency is controlled according to wavelength in order for the objective lens 140 to selectively block or transmit the light having the plurality of wavelengths. The objective lens 140 is compatible with two or more disks having different thicknesses or formats using light having two or more wavelengths. That is, the objective lens 140 has different NA according to the wavelengths. The objective lens 140 is divided into two or more concentric regions about an optical axis, and each region is used for a different wavelength. For example, as shown in FIG. 9A, the objective lens 140 may include the diffracting region 140a, and the transmitting region 140b divided into first through third regions 141, 142, and 143, which are arranged about the optical axis.

When the objective lens 140 is used for light having first through third wavelengths, the first region 141 may be commonly used for the first through third wavelengths, the second region 142 may be commonly used for the second and third wavelengths, and the third region 143 may be used for the third wavelength. The first through third wavelengths may be 780 nm, 660 nm, and 400 nm, respectively. However, it is understood that the objective lens 140 is not limited thereto such that the first region 141 may be used for the first wavelength, the second region 142 may be used for the second and third wavelengths, and the third region 143 may be used commonly for the first through third wavelengths.

The objective lens 140 of the unit to remove crosstalk of FIG. 8 may be compatible with a blu-ray disk (BD), a digital versatile disk (DVD), and a compact disk (CD) each having a plurality of recording layers, or may be compatible with a high definition-digital versatile disk (HD-DVD), a DVD, and a CD each having a plurality of recording layers. In this case, for example, the NA of the objective lens 140 may be 0.62 in the case of the HD-DVD and the DVD, and 0.45 in the case of the CD. However, it is further understood that the NA of the objective lens need not be limited thereto and may be different depending upon the technology used.

The diffracting region 140a may block light having a relatively shorter wavelength and may transmit light having a relatively longer wavelength among the plurality of wavelengths. Since an interval between adjacent layers of a disk using light of a relatively longer wavelength is larger than an interval between adjacent layers of a disk using a relatively shorter wavelength, the disk using the relatively longer wavelength is less affected by crosstalk between the adjacent layers. As such, the need to block the light having the longer wavelength by the diffraction region 140a is less. Accordingly, the diffracting region 140a selectively blocks or transmits light according to the wavelength of the light to decrease the transmittance of the light having the shorter wavelength and increase the transmittance of the light having the longer wavelength, thereby improving light efficiency.

Figure 9B:
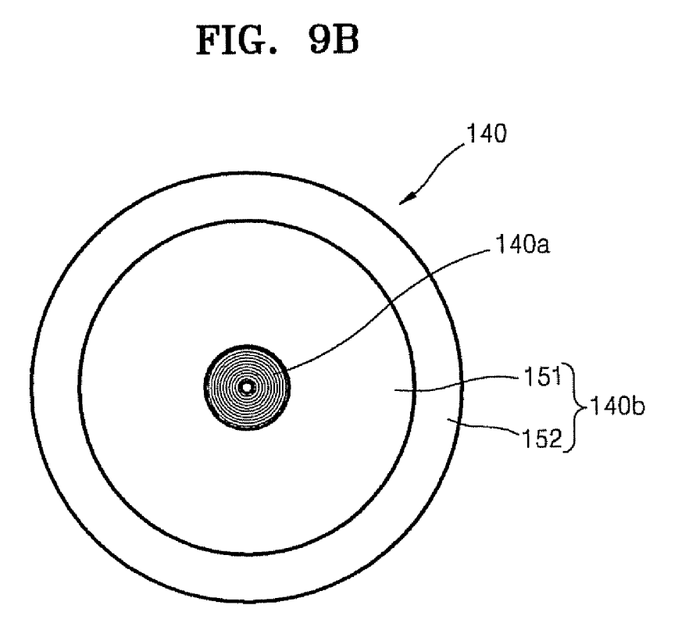

As shown in FIG. 9B, the objective lens 140 may include the diffracting region 140a, and the transmitting region 140b divided into first and second regions 151 and 152 wherein the first region 151 may be commonly used for first through third wavelengths and the second region 152 may be used for light having an intermediate wavelength among the first through third wavelengths. For example, the NA of the objective lens 140 may be 0.65 in the case of the HD-DVD, 0.63 in the case of the DVD, and 0.45 in the case of the CD. Alternatively, when light having first and second wavelengths is used, the first region 151 may be commonly used for the light having the first and second wavelengths, and the second region 152 may be used for the light having the shorter wavelength. For example, the first and second wavelengths may be 400 nm and 660 nm, respectively. A hologram for compatibility is formed in each region 151 and 152 of the transmitting region 140b, and first order light among the light diffracted by the hologram is used. However, it is understood that the wavelengths of the light used in each of the first and second regions 151 and 152 is not limited thereto such that light having a longer or shorter wavelength may be used.

Figure 10:
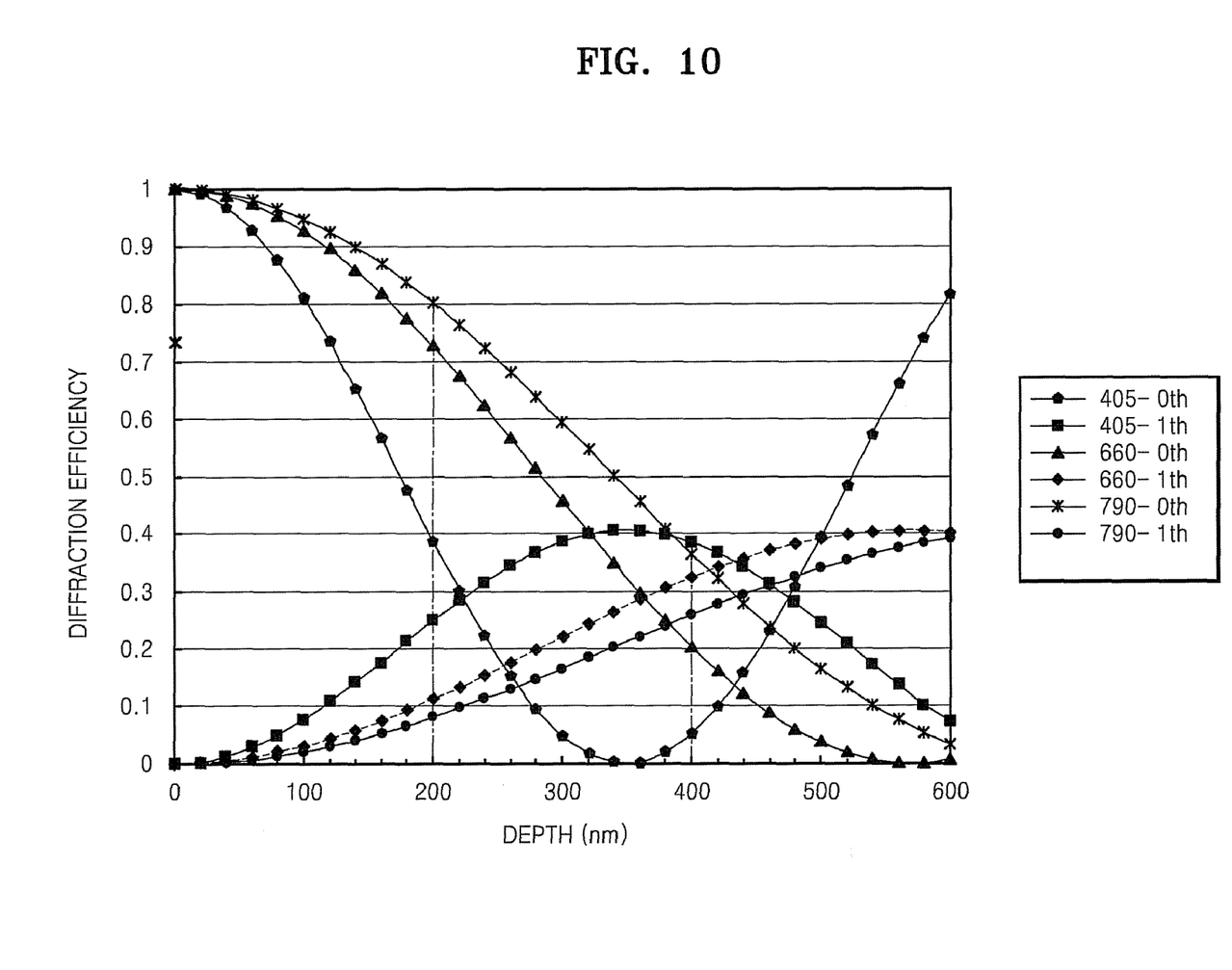
FIG. 10 illustrates a change in diffraction efficiency according to the depth of a diffraction pattern of a diffracting region of the unit of FIG. 8 for each wavelength.

In order to control the light transmittance of the diffracting region 140a according to the wavelength of light, the diffraction pattern of the diffracting region 140a may be changed. For example, the diffraction pattern having a desired diffraction efficiency may be obtained by changing the depth d and the pitch T of the diffraction pattern and determining the resultant diffraction efficiency or transmittance. FIG. 10 illustrates a change in the diffraction efficiency according to the depth d of the diffraction pattern.

The objective lens 140, which is compatible with disks having different formats, may be used for light having a wavelength of 400±20 nm, a wavelength of 60±20 nm, and a wavelength of 780±20 nm. In this case, the objective lens 140 decreases diffraction efficiency for light having a longer wavelength and thereby decreases transmittance thereof, while the objective lens 140 increases diffraction efficiency for light having a shorter wavelength and thereby increases transmittance thereof. For example, when the objective lens 140 is used for light having wavelengths of 405, 660, and 790 nm, the diffraction efficiency of the diffracting region 140a is formed such that the transmittance or diffraction efficiency of the light having the wavelength of 405 nm is decreased so as to block the light having the wavelength of 405 nm, and the diffracting region 140a is formed such that the transmittance or diffraction efficiency of the light having the wavelengths of 660 nm and 790 nm is increased so as to transmit the light having the wavelengths of 660 nm and 790 nm. The diffracting region 140a transmits zero order light, and the diffraction efficiency of first order light is low with respect to all three wavelengths. Accordingly, the following explanation will be made by focusing on diffraction efficiency for zero order light.

FIG. 10 illustrates diffraction efficiency for wavelengths of 405 nm, 660 nm, and 790 nm according to the depth n of the diffraction pattern. Zero order light is used for all the wavelengths. Referring to FIG. 10, the diffracting region 140a may have the diffraction pattern having a depth of 200 to 400 nm so that light transmittance or diffraction efficiency is relatively high for the wavelengths of 660 nm and 790 nm and is relatively low for the wavelength of 405 nm. In such case, the diffraction efficiency is less than approximately 40% for the wavelength of 405 nm, diffraction efficiency is more than approximately 20% for the wavelength of 660 nm, and diffraction efficiency is more than approximately 40% for the wavelength of 790 nm.

Accordingly, the light having the relatively shorter wavelength may be blocked by forming the objective lens 140 to have a lower diffraction efficiency with respect to the light having the relatively shorter wavelength, and the light having the relatively longer wavelength may be efficiently used to record or reproduce data to or from the disk by forming the objective lens 140 to have a higher diffraction efficiency with respect to the light having the relatively longer wavelength. Although the above description is with reference to the objective lens 140, aspects of the present invention are not limited thereto such that a unit separate from an objective lens (such as illustrated in FIG. 2) may have similar optical properties and be used according to some aspects.

Figure 11:
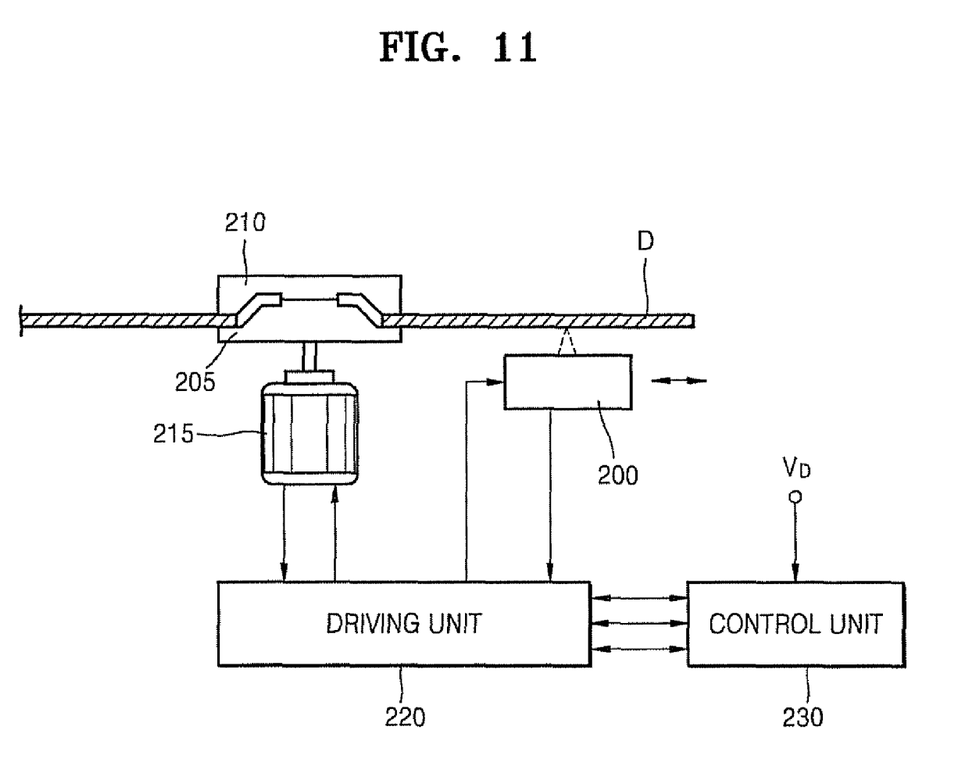
FIG. 11 illustrates an optical recording and/or reproducing apparatus according to an exemplary embodiment of the present invention.

An optical pickup employing one of the units to remove crosstalk of FIGS. 2 through 8 can prevent light reflected by a recording layer adjacent to a target recording layer from interfering with light reflected by the target recording layer. FIG. 11 illustrates an optical recording and/or reproducing apparatus according to an exemplary embodiment of the present invention. Referring to FIG. 11, the optical recording and/or reproducing apparatus includes a spindle motor 215 installed under a turntable 205, which rotates a disk D mounted on the turntable 205, and a clamp 210 facing the turntable 205 and chucking the disk D, that is, an information storage medium, using an electromagnetic force produced by an interaction between the turntable 205 and the clamp 210.

An optical pickup 200 is moved in a radial direction of the disk D when the disk D is rotated by the spindle motor 215, and reproduces and/or records data on and/or from the disk D. The spindle motor 215 and the optical pickup 200 are driven by a driving unit 220, and focusing and tracking servos of the optical pickup 200 are controlled by a control unit 230, which performs data recording and/or reproduction on and/or from the disk D.

The optical pickup 200 is constructed as described above with reference to FIG. 2, and a unit to remove crosstalk may be constructed as described above with reference to FIGS. 4A, 4B, 5A, 5B, 9A, and 9B.

Light detected and converted into a photoelectric signal by the optical pickup 200 is input to the control unit 230 through the driving unit 220. The driving unit 220 controls the rotational speed of the spindle motor 215, amplifies an input signal, and drives the optical pickup 200.

The control unit 230 delivers a focusing servo command and a tracking servo command adjusted based on a signal input from the driving unit 220 to the driving unit 220 again in order to enable the optical pickup 200 to perform focusing and tracking operations. The unit to remove the crosstalk of the optical pickup 200 removes crosstalk by preventing light reflected by a recording layer adjacent to a target recording layer from interfering with a reproduction signal reflected by the target recording layer, thereby avoiding noise in the reproduction signal and improving recording and/or reproduction characteristics.

As described above, the unit to remove the crosstalk according to aspects of the present invention can prevent light reflected by a recording layer adjacent to a target recording layer, on and/or from which data is to be recorded and/or reproduced, of a disk having a plurality of recording layers from combining with light reflected by the target recording layer and causing noise in a reproduction signal, thereby improving the recording and/or reproduction characteristics of the disk.

Also, the optical pickup and the optical recording and/or reproducing apparatus according to aspects of the present invention employs the unit to remove the crosstalk to record and/or reproduce data on and/or from the disk, thereby preventing light reflected by a recording layer adjacent to a target recording layer from interfering with and degrading a reproduction signal.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A unit to remove crosstalk, comprising:
a diffracting region configured to diffract light reflected from a recording layer adjacent to a target recording layer, on and/or from which data is to be recorded and/or reproduced, of a disk having a plurality of recording layers to prevent the light reflected by the recording layer adjacent to the target recording layer from reaching a photodetector and to prevent the light reflected by the adjacent recording layer from interfering with light reflected by the target recording layer; and
a transmitting region arranged about the diffracting region and configured to transmit light reflected from the target recording layer,
wherein the diffracting region is divided into a first region and a second region, and the first and second regions have diffraction patterns arranged in different directions.

2. The unit of claim 1, wherein the diffraction pattern of the first region and the diffraction pattern of the second region are arranged to intersect each other at a right angle.

3. The unit of claim 1, wherein the unit further comprises:
an objective lens integrally formed with the diffracting region and the transmitting region, wherein the objective lens focuses the incident light on the target recording layer.

4. An optical pickup recording and/or reproducing data on and/or from a target recording layer of a disk having a plurality of recording layers, the optical pickup comprising:
a light source;
a beam splitter to reflect a part of incident light thereon and to transmit the rest of the incident light;
the unit to remove crosstalk of claim 1;
an objective lens to focus incident light on the disk; and
a photodetector to detect light reflected by the disk,
wherein the unit to remove crosstalk decreases noise from light reflected by the plurality of recording layers adjacent to the target recording layer as detected by the photodetector.

5. The optical pickup of claim 4, wherein the diffraction patterns of the first and second regions are arranged to intersect each other at a right angle.

6. The optical pickup of claim 4, wherein the unit for removing the crosstalk and the objective lens are integrally formed with each other.

7. An optical recording and/or reproducing apparatus, comprising:
an optical pickup to record and/or reproduce data on and/or from a target recording layer of a disk having a plurality of recording layers;
a driving unit to drive the optical pickup; and
a control unit to control the optical pickup,
wherein the optical pickup comprises:
a light source, a beam splitter to reflect a part of incident light thereon and to transmit the rest of the incident light,
the unit to remove crosstalk of claim 1,
an objective lens to focus incident light on the disk, and
a photodetector to detect light reflected by the disk,
wherein the unit to remove crosstalk decreases noise from light reflected by the plurality of recording layers adjacent to the target recording layer as detected by the photodetector.

8. The optical recording/reproducing apparatus of claim 7, wherein the diffraction patterns of the first and second regions are arranged to intersect each other at a right angle.

9. The optical recording/reproducing apparatus of claim 7, wherein the unit for removing the crosstalk and the objective lens are integrally formed with each other.

10. A unit to remove crosstalk, comprising:
a diffracting region configured to diffract light incident to a recording layer adjacent to a target recording layer, on and/or from which data is to be recorded and/or reproduced, of a disk having a plurality of recording layers to prevent the light reflected by the recording layer adjacent to the target recording layer from reaching a photodetector and to prevent the light reflected by the adjacent recording layer from interfering with light reflected by the target recording layer; and
a transmitting region arranged about the diffracting region and configured to transmit light incident to the target recording layer,
wherein the diffracting region is divided into a first region and a second region, and the first and second regions have diffraction patterns arranged in different directions.

* * * * *